US011161144B1

(12) United States Patent
Dinardi

(10) Patent No.: US 11,161,144 B1
(45) Date of Patent: *Nov. 2, 2021

(54) VEHICLE COMPOUNDING SYSTEM

(71) Applicant: Francesco Alfonso Dinardi, Yonkers, NY (US)

(72) Inventor: Francesco Alfonso Dinardi, Yonkers, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 16/883,287

(22) Filed: May 26, 2020

Related U.S. Application Data

(63) Continuation-in-part of application No. 16/148,070, filed on Oct. 1, 2018, now Pat. No. 10,688,515.

(51) Int. Cl.
*B05D 1/02* (2006.01)
*B05D 5/00* (2006.01)
*B24B 29/00* (2006.01)
*B60S 3/04* (2006.01)

(52) U.S. Cl.
CPC .............. *B05D 5/005* (2013.01); *B24B 29/00* (2013.01); *B60S 3/047* (2013.01)

(58) Field of Classification Search
CPC ........... C07C 5/10; C07C 13/28; C07C 13/50; C07C 2602/10; C07C 2602/28; A47L 11/164; A47L 11/4038; A47L 11/4041; A47L 11/4069; C11D 17/049; C10M 105/04; C10M 2203/02; C10M 2203/022; C10M 2203/024; C10M 2203/04
See application file for complete search history.

(56) References Cited

U.S. PATENT DOCUMENTS

| | | | |
|---|---|---|---|
| 3,554,450 A | 1/1971 | D'Muhala | |
| 4,925,101 A | 5/1990 | Konieczynski et al. | |
| 5,267,693 A | 12/1993 | Dickey | |
| 5,396,737 A * | 3/1995 | Englund | B24D 11/001 |
| | | | 451/28 |
| 6,402,053 B1 | 6/2002 | Chih | |
| 6,446,881 B1 | 9/2002 | You | |
| 7,798,425 B2 | 9/2010 | Joseph et al. | |
| 8,141,754 B2 | 3/2012 | Conner et al. | |

OTHER PUBLICATIONS

Duplessie, Keith. "Detailing Chemicals: No. Magic—Just Basic Chemistry". Auto Laundry News, <<http://www.carwashmag.com/issues/sept-2012/detail-management.cfm>> (Sep. 2012). (Year: 2012).*

* cited by examiner

*Primary Examiner* — Alexander M Weddle
(74) *Attorney, Agent, or Firm* — Goldstein Law Offices, P.C.

(57) ABSTRACT

A compounding system for use in finishing a vehicle having a vehicle body having painted surfaces. The compounding system employs a sprayer having a nozzle having a fluid opening that is substantially 3 millimeters in diameter and a reservoir in communication with the fluid opening. Compressed air carries compound paste from the reservoir to the fluid opening to atomize the compound paste into a compound spray that is used to cover all of the painted surfaces of the vehicle with a thin, uniform coating in a single step. The compound paste is removed by buffing all painted surfaces on the vehicle body to a shine in a single step.

4 Claims, 9 Drawing Sheets

VEHICLE COMPOUNDING SYSTEM

CROSS REFERENCES AND RELATED SUBJECT MATTER

This application is a continuation-in-part of non-provisional patent application Ser. No. 16,148,070, filed in the United States Patent Office on Oct. 1, 2018, from which priority is claimed and which is incorporated by reference herein in its entirety.

TECHNICAL FIELD

The present disclosure relates generally to a vehicle compounding system. More particularly, the present disclosure relates to a system that promotes uniform compounding across the painted surfaces of a vehicle body.

BACKGROUND

Newly painted automobiles require compounding. The paint process inherently creates a variety of imperfections including dust that includes paint that has dried mid-air within the spray booth and has settled and adhered to the freshly painted surfaces of the vehicle. Through compounding, such imperfections are eliminated through the repeated application of a thick compound paste and its removal by high velocity buffing in a process generally known as "compounding".

Compounding is generally carried out by squirting compound paste in globs onto a body panel or a small portion of the vehicle and then immediately buffing that portion. The compound paste must only be applied to a small area—as big an area as can be buffed and removed within a short period of time—because if a glob of compound remains on the paint, it will 'burn' the paint and can leave a permanent scar in the vehicle's appearance. Accordingly, within the field it is highly inadvisable to apply compound to more than a small portion of the car to avoid burning the paint, and encountering extreme difficulty in removing compound that has dried on the paint.

Even when the compound paste is removed quickly, this process of compounding has inherent limitations and difficulties. Accordingly, it requires much skill and experience to properly compound a newly painted car. It is for this reason that at many body shops it is only the most experienced personnel—often the shop owner—that is trusted to do it. Clearly this creates a production bottleneck that stalls the growth of their businesses.

Generally attempts at solving this problem have been in trying to improve the compounding paste itself. While these units may be suitable for the particular purpose employed, or for general use, they would not be as suitable for the purposes of the present disclosure as disclosed hereafter.

In the present disclosure, where a document, act or item of knowledge is referred to or discussed, this reference or discussion is not an admission that the document, act or item of knowledge or any combination thereof was at the priority date, publicly available, known to the public, part of common general knowledge or otherwise constitutes prior art under the applicable statutory provisions; or is known to be relevant to an attempt to solve any problem with which the present disclosure is concerned.

While certain aspects of conventional technologies have been discussed to facilitate the present disclosure, no technical aspects are disclaimed and it is contemplated that the claims may encompass one or more of the conventional technical aspects discussed herein.

BRIEF SUMMARY

An aspect of an example embodiment in the present disclosure is to provide a system for compounding a vehicle that overcomes the limitations inherent in current practices that haphazardly squirt globs of compound paste onto a vehicle body. Accordingly, the present disclosure provides a system that evenly covers a vehicle body with a thin layer of compound paste.

It is another aspect of an example embodiment in the present disclosure to provide a system for compounding a vehicle that facilitates the even application of compound paste onto a vehicle body. Accordingly, the compound paste is sprayed onto the entire vehicle to create the requisite thin coating on all painted surfaces.

It is yet another aspect of an example embodiment in the present disclosure to provide a system for compounding a vehicle that allows the high viscosity paste to be atomized and sprayed on the vehicle. Accordingly a sprayer is provided that has a large central opening that can atomize compound paste into a fine spray without clogging.

It is a further aspect of an example embodiment in the present disclosure to provide a system that allows the vehicle to be efficiently and easily compounded with superior results. Accordingly, the new found ability to spray compound paste onto the entire vehicle in a single step, and then buff and remove it in a single step—without harming the paint—provides significant efficiency and time savings while providing a consistent shine to all painted surfaces.

Accordingly, the present disclosure describes a compounding system for use in finishing a vehicle having a vehicle body having painted surfaces. The compounding system employs a sprayer having a nozzle having a fluid opening that is substantially 3 millimeters in diameter and a reservoir in communication with the fluid opening. Compressed air carries compound paste from the reservoir to the fluid opening to atomize the compound paste into a compound spray that is used to cover all of the painted surfaces of the vehicle with a thin, uniform coating in a single step. The compound paste is removed by buffing all painted surfaces on the vehicle body to a shine in a single step.

The present disclosure addresses at least one of the foregoing disadvantages. However, it is contemplated that the present disclosure may prove useful in addressing other problems and deficiencies in a number of technical areas. Therefore, the claims should not necessarily be construed as limited to addressing any of the particular problems or deficiencies discussed hereinabove. To the accomplishment of the above, this disclosure may be embodied in the form illustrated in the accompanying drawings. Attention is called to the fact, however, that the drawings are illustrative only. Variations are contemplated as being part of the disclosure.

BRIEF DESCRIPTION OF THE DRAWINGS

In the drawings, like elements are depicted by like reference numerals. The drawings are briefly described as follows.

The present disclosure now will be described more fully hereinafter with reference to the accompanying drawings, which show various example embodiments. However, the present disclosure may be embodied in many different forms and should not be construed as limited to the example embodiments set forth herein. Rather, these example embodiments are provided so that the present disclosure is thorough, complete and fully conveys the scope of the present disclosure to those skilled in the art.

DETAILED DESCRIPTION OF THE PREFERRED EMBODIMENTS

Figure 1:
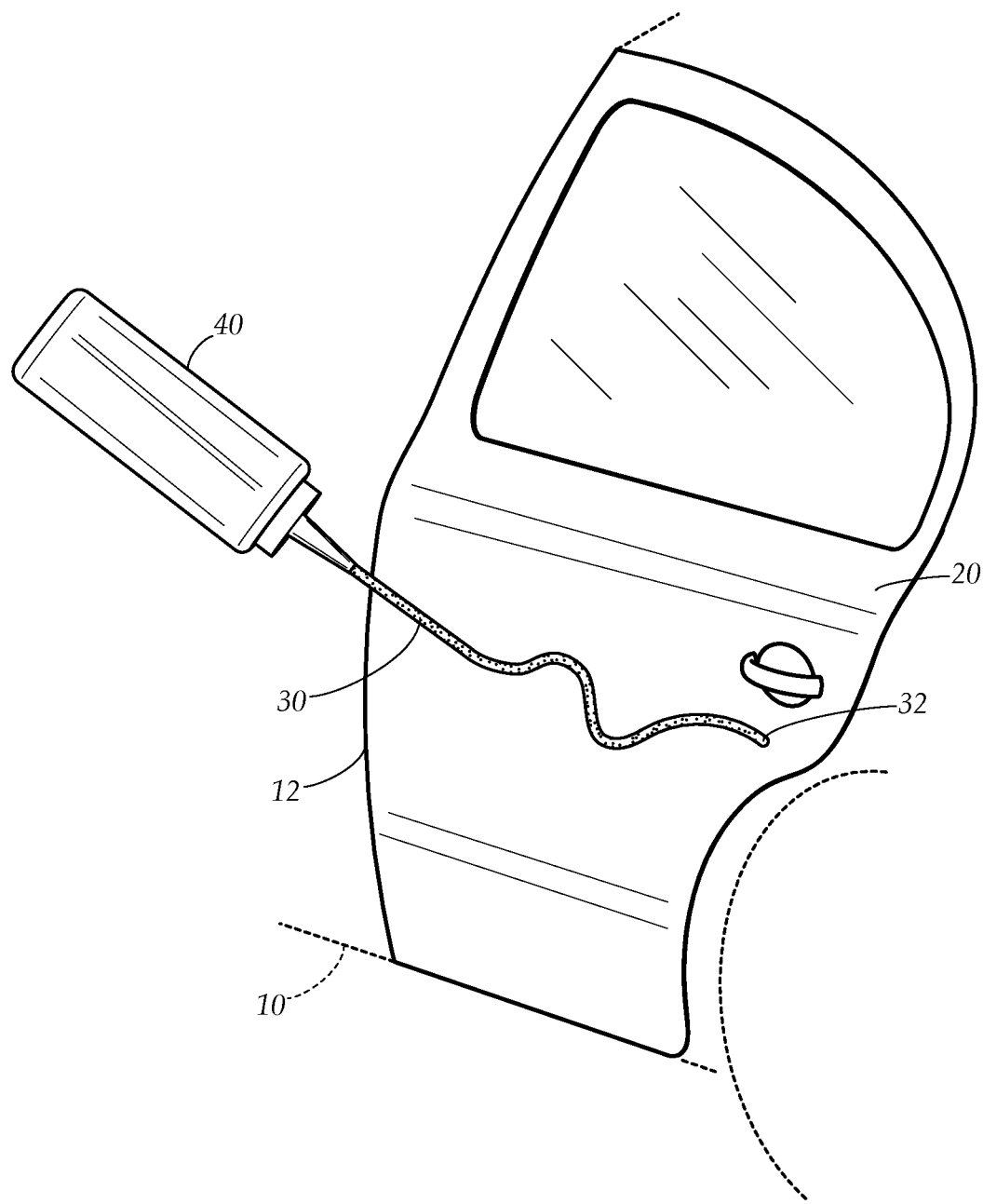
FIG. 1 is a diagrammatic perspective view, illustrating the common method of squirting compound paste onto a single vehicle panel.
Figure 2:
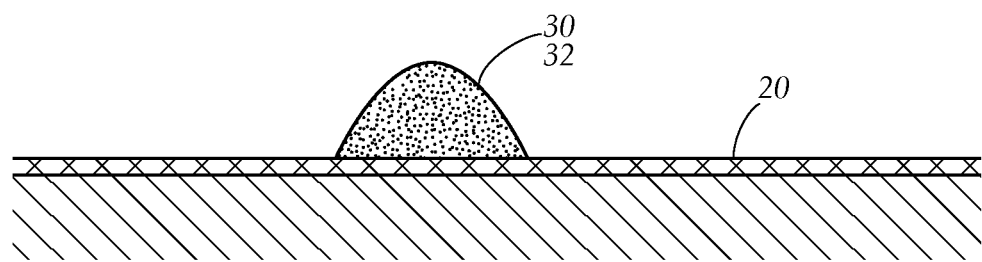
FIG. 2 is a side elevational view, with parts broken away, illustrating a glob of compound of compound paste on a vehicle body panel.
Figure 3:
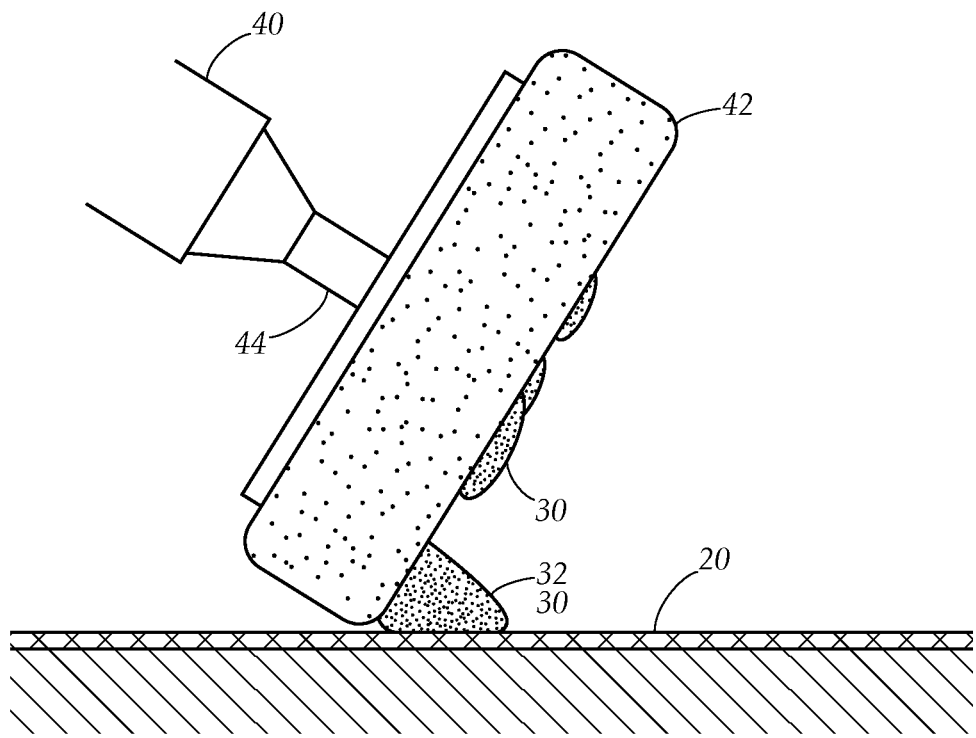
FIG. 3 is a side elevational view, with parts broken away, illustrating the glob of compound paste being unevenly distributed on a rotating buffing pad.

FIGS. 1-3 illustrates prior art compounding procedures. In particular, FIG. 1 illustrates a vehicle body panel 12 of a vehicle body 10. The vehicle body 10 and vehicle body panel 12 has a painted surface 20. Generally, prior to compounding, the vehicle is painted by spraying all painted surfaces of the vehicle body 10 with automotive paint. Often several coats of paint will be applied. In FIG. 1, compound paste 30 is contained within a squirt bottle 40 and is being squirted onto the painted surface 20 by squeezing the squirt bottle 40. The compound paste 30 is an abrasive paste that contains fine grit components. The compound paste 30 is accumulating on the painted surface 20 in globs 32, such as seen in FIG. 2, where portions of the painted surface 20 have a large quantity of compound paste 30 while portions of the painted surface 20 remain entirely uncoated by the compound paste 30. Referring now to FIG. 3, a buffer 40 is being used to perform a buffing operation. In particular a buffing pad 42 (or bonnet) is secured to the buffer 40 via a rotating shaft 44. The buffing pad 42 is rotated by the buffer 40 and is placed in edgewise engagement with the painted surface 20 as shown. Note that as the buffer 40 encounters globs 32 of compound paste 30 on the painted surface 20, it is spread onto the buffing pad 42 in an uneven manner, which results it in haphazardly re-encountering the painted surface 20 as the buffing operation continues.

Figure 4A:
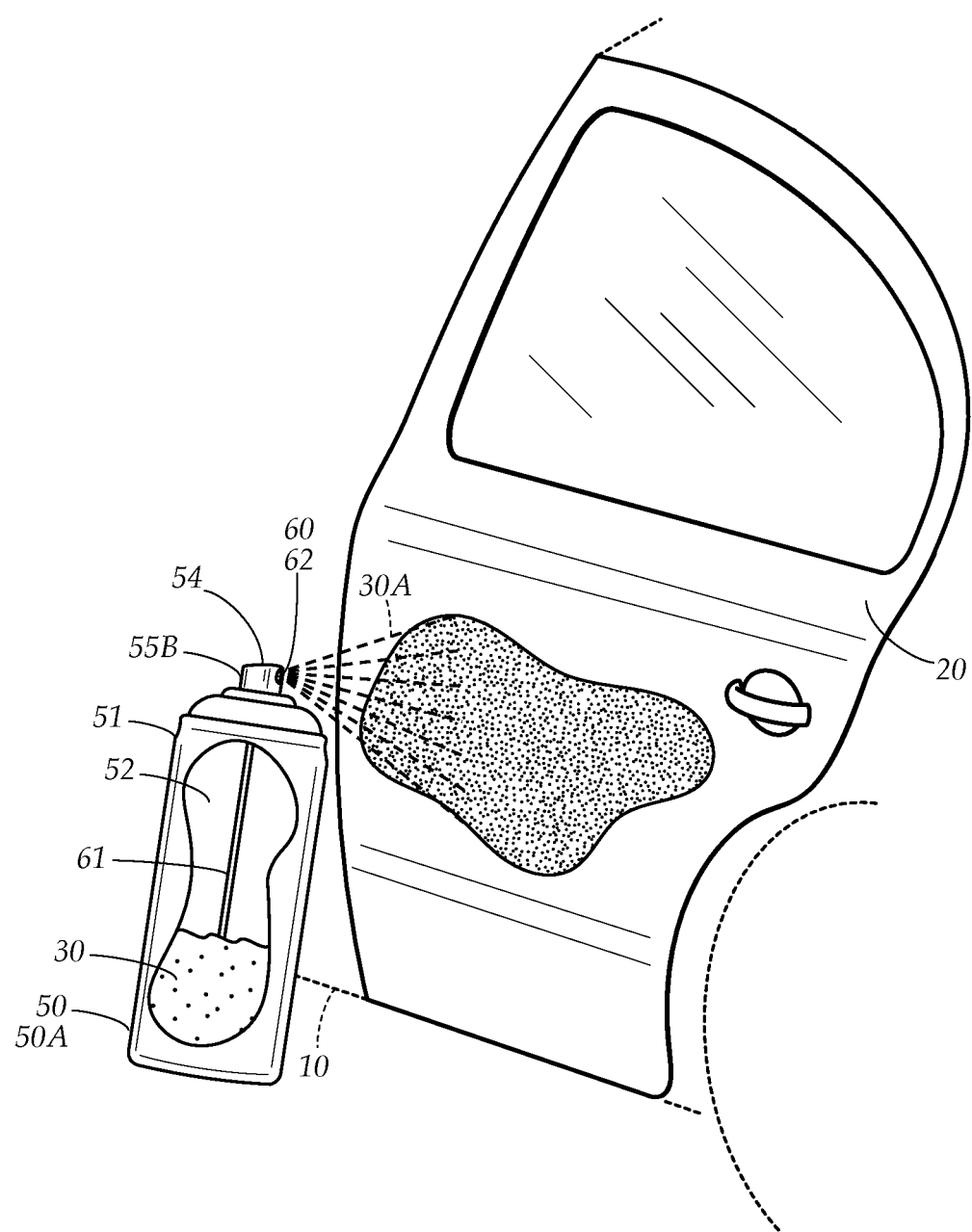
FIG. 4A is a diagrammatic perspective view, illustrating a sprayer in the form of a spray can, having a reservoir containing compound paste being used to atomize and spray compound paste onto the vehicle body in a thin, even coating.

In accordance with the principles of the present disclosure, referring to FIG. 4A, painted surfaces 20 of the vehicle body 10 are being sprayed with compound paste 30 using a sprayer 50. In the embodiment shown, the sprayer is provided in the form of a spray can 50A. The spray can 50A has a body 51, a reservoir 52 that contains a quantity of the compound paste 30, a spray control assembly 54 that includes a button trigger 55B and a nozzle 60. A fluid tube 61 connects the reservoir 52 with the nozzle 60. Compressed air is contained within the reservoir 52 for controlling the flow of compressed air and compound paste 30 through the fluid tube 61 and nozzle 60. The nozzle 60 atomizes the compound paste 30 and is atomized into a compound paste spray 30A that is sprayed onto the painted surfaces 20. The button trigger 55B contains a valve that selectively allows compressed air from the reservoir 52 to carry compound paste 30 in a flow toward the nozzle 60 and to atomize the compound paste 30 from the reservoir 52 when the button trigger control 55B is depressed. The nozzle 60 has a fluid opening 62 that is at least 3 millimeters in diameter, and optimally should be substantially 3 millimeters in diameter. The fluid opening 62 allows the spray can 50A to atomize the thick compound paste 30 into the fine spray of compound paste 30A.

Figure 4B:
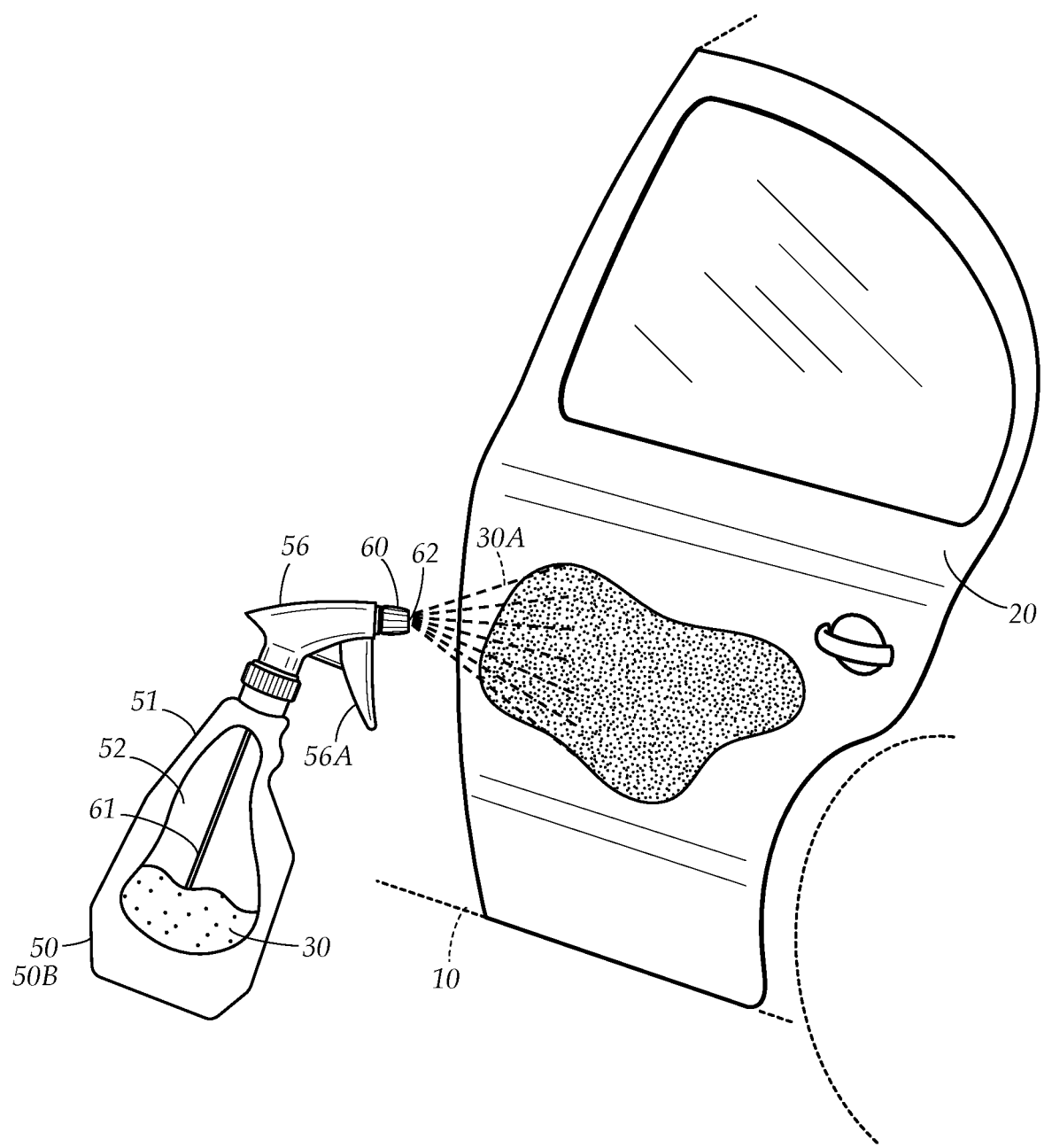
FIG. 4B is a diagrammatic perspective view, illustrating a sprayer in the form of a spray bottle, having a reservoir containing compound paste being used to atomize and spray compound paste onto the vehicle body in a thin, even coating.

FIG. 4B is similar to FIG. 4A, except wherein the sprayer 50 is a spray bottle 50B. The painted surfaces 20 of the vehicle body 10 are being sprayed with compound paste 30 using the spray bottle 50B. The spray bottle 50B has a body 51, a reservoir 52 that contains a quantity of the compound paste 30, a spray pump assembly 56 that includes a pump trigger 56A and a nozzle 60. A fluid tube 61 connects the reservoir 52 with the nozzle 60. The manual actuation of the spray pump assembly 56, by depressing the pump trigger 56A by the user, compresses air within the reservoir 52 and generates the flow of compressed air and compound paste 30 through the fluid tube 61 and nozzle 60. The nozzle 60 atomizes the compound paste 30 and is atomized into a compound paste spray 30A that is sprayed onto the painted surfaces 20. The nozzle 60 has a fluid opening 62 that is at least 3 millimeters in diameter, and optimally should be substantially 3 millimeters in diameter. The fluid opening 62 allows the spray bottle 50B to atomize the thick compound paste 30 into the fine spray of compound paste 30A.

Figure 8:
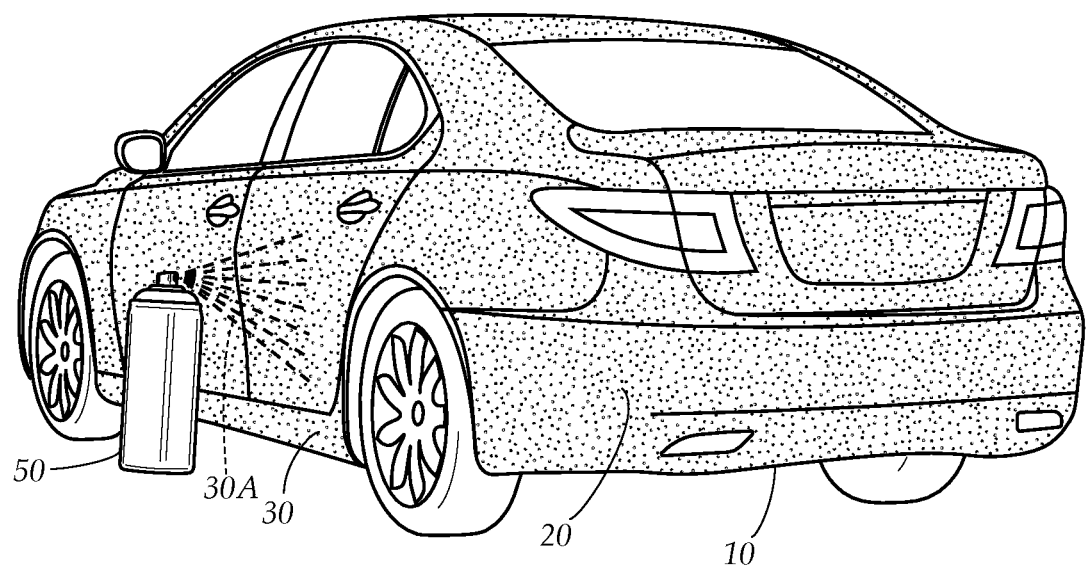
FIG. 8 is a diagrammatic perspective view, illustrating the sprayer creating a thin, even coating of compounding paste on all painted surfaces of the vehicle body.

Referring to FIG. 8, the sprayer 50 is actuated and is producing the compound paste spray 30A. Note that ordinarily the vehicle would be masked to cover non-painted surfaces and prevent them from being covered, but in FIG. 8 such masking is omitted for the sake of illustration clarity. The compound paste spray 30A is directed at the vehicle body 10 and the user proceeds to spray all painted surfaces 20 of the vehicle body 10, so that all painted surfaces 20 of the vehicle body 10 are covered with a substantially uniform coating of compound paste 30 in a single operation. Note that covering the entire vehicle with compound in a single step was considered highly inadvisable prior to the innovation described herein. The unexpected ability to spray compound thinly and uniformly across the vehicle allows this to take place without the normally expected consequences of leaving compound on a vehicle for an extended period of time—including burning the paint.

Figure 5:
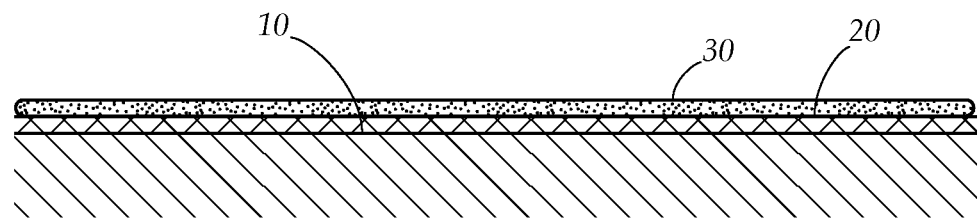
FIG. 5 is a side elevational view, with parts broken away, illustrating a thin, even coating of compound paste on a vehicle body panel.
Figure 6:
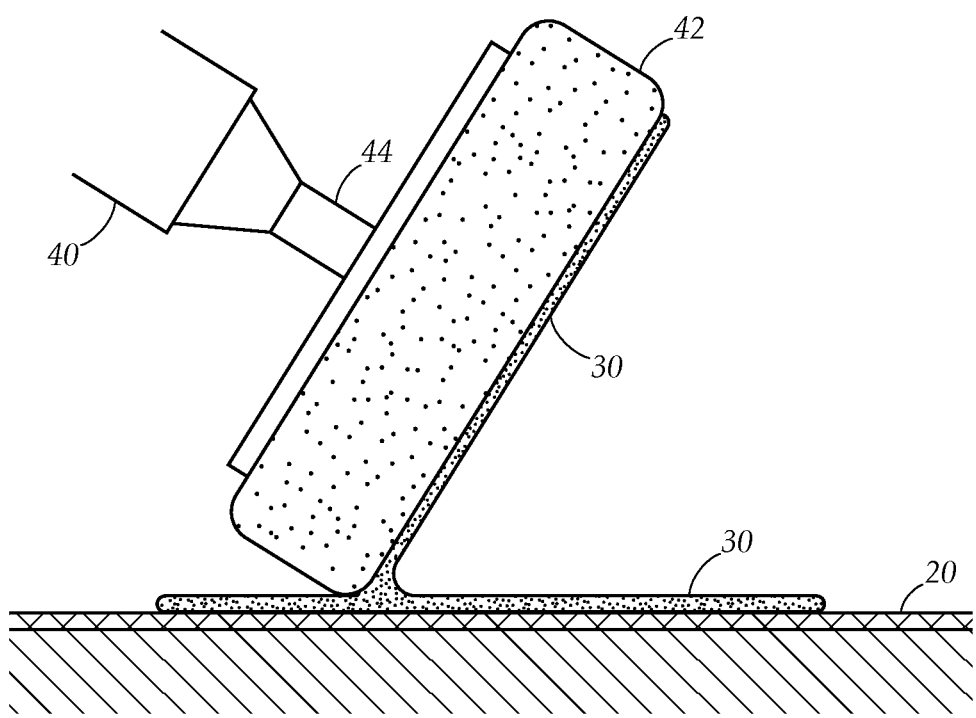
FIG. 6 is a side elevational view, with parts broken away, illustrating compound paste being evenly distributed onto a rotating buffing pad.
Figure 7:
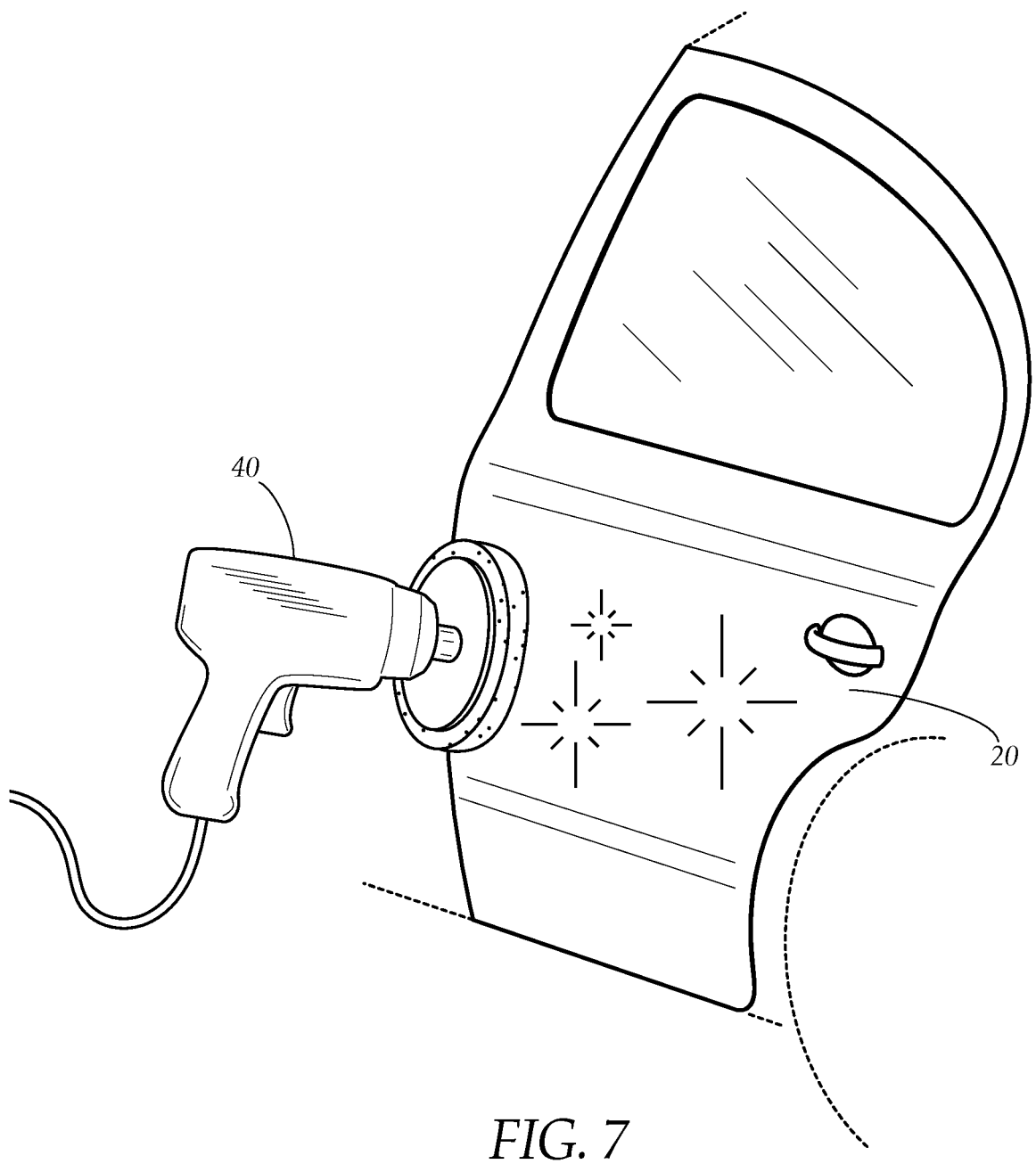
FIG. 7 is a diagrammatic perspective view, illustrating paint on the vehicle panel being brought to a high gloss shine via the rotating buffing pad.

Referring to FIG. 5, after the spraying operation is complete, all painted surfaces 20 of the vehicle body 10 are covered with the compound paste 30 as shown in FIG. 5. Next, referring to FIG. 6, a buffing step commences whereupon the buffer 40 is actuated to rotate the buffing pad 42 via the rotating shaft 44. Note that because of the uniform coating of compound paste 30 on the painted surfaces 20, the buffing pad 42 acquires a uniform coating of compound paste 30, which further facilitates even compounding of the painted surfaces 20. The buffing continues across all painted surfaces 20, until as illustrated in FIG. 7, the buffer 40 has been utilized to bring all painted surfaces 20 to a high gloss shine. Notably the user does not need to interrupt the buffing to reapply compound, since all painted surfaces 20 were coated prior to the buffing commencing, as seen in FIG. 8. Accordingly, not only are the results superior to prior art processes, but the results can be achieved much faster because the application of compound is consolidated to a single operation and buffing is a single continuous operation.

It is understood that when an element is referred hereinabove as being "on" another element, it can be directly on the other element or intervening elements may be present therebetween. In contrast, when an element is referred to as being "directly on" another element, there are no intervening elements present.

Moreover, any components or materials can be formed from a same, structurally continuous piece or separately fabricated and connected.

It is further understood that, although ordinal terms, such as, "first," "second," "third," are used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

Spatially relative terms, such as "beneath," "below," "lower," "above," "upper" and the like, are used herein for ease of description to describe one element or feature's relationship to another element(s) or feature(s) as illustrated in the figures. It is understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device can be otherwise oriented (rotated 90 degrees or at other orientations) and the spatially relative descriptors used herein interpreted accordingly.

Example embodiments are described herein with reference to cross section illustrations that are schematic illustrations of idealized embodiments. As such, variations from the shapes of the illustrations as a result, for example, of manufacturing techniques and/or tolerances, are to be expected. Thus, example embodiments described herein should not be construed as limited to the particular shapes of regions as illustrated herein, but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

In conclusion, herein is presented a vehicle compounding system that allows an entire vehicle to be compounded in an efficient manner, easily, and with superior results. The disclosure is illustrated by example in the drawing figures, and throughout the written description. It should be understood that numerous variations are possible, while adhering to the inventive concept. Such variations are contemplated as being a part of the present disclosure.

What is claimed is:

1. A compounding system, for use on a vehicle body using compound paste and a sprayer, comprising the steps of:
    creating painted surfaces on a vehicle body using automotive paint;
    spraying compound paste onto all painted surfaces in a single step; and then
    shining all painted surfaces by removing the compound paste by buffing all painted surfaces in a single step.

2. The compounding system as recited in claim 1, wherein the steps as recited are preceded by the step of providing a sprayer having a nozzle having a fluid opening of substantially 3 millimeters and a reservoir containing compound paste in communication with the fluid opening, and wherein the step of spraying compound paste onto all painted surfaces further comprises atomizing the compound paste into a compound paste spray by the sprayer at the fluid opening.

3. A compounding system, for use on a vehicle body having painted surfaces, using compound paste and a sprayer having a fluid opening of substantially 3 millimeters and a buffer having a buffing pad, comprising the steps of:
    spraying compound paste onto all painted surfaces in a single step; and then
    shining all painted surfaces by removing the compound paste by buffing all painted surfaces in a single step by engaging the painted surfaces with a rotating buffing pad.

4. The compounding system as recited in claim 3, wherein the sprayer is selected from the group consisting of a spray can having a reservoir containing the compound paste and compressed air, and a spray bottle having a reservoir containing the compound paste and a spray pump having a pump trigger for manually compressing air into the reservoir.

* * * * *